US012626681B2

(12) United States Patent
Yu et al.

(10) Patent No.: US 12,626,681 B2
(45) Date of Patent: May 12, 2026

(54) AUDIO PROCESSING METHOD FOR NOISE-REDUCTION EARPHONE, NOISE-REDUCTION EARPHONE, DEVICE AND READABLE STORAGE MEDIUM

(71) Applicant: GOERTEK TECHNOLOGY CO., LTD., Qingdao (CN)

(72) Inventors: Kai Yu, Qingdao (CN); Shanshan Jiao, Qingdao (CN); Yang Hua, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 145 days.

(21) Appl. No.: 18/635,314

(22) Filed: Apr. 15, 2024

(65) Prior Publication Data

US 2024/0257796 A1 Aug. 1, 2024

Related U.S. Application Data

(63) Continuation of application No. PCT/CN2021/139379, filed on Dec. 18, 2021.

(30) Foreign Application Priority Data

Nov. 29, 2021 (CN) ......................... 202111438107.0

(51) Int. Cl.
*G10K 11/178* (2006.01)

(52) U.S. Cl.
CPC .. *G10K 11/17815* (2018.01); *G10K 11/17881* (2018.01); *G10K 2210/1081* (2013.01);
(Continued)

(58) Field of Classification Search
CPC ....... G10K 11/17815; G10K 11/17881; G10K 2210/1081; G10K 2210/3026;
(Continued)

(56) References Cited

U.S. PATENT DOCUMENTS 6,118,878 A * 9/2000 Jones ............... G10K 11/17855
381/94.1
2020/0020313 A1 1/2020 Hua et al.

FOREIGN PATENT DOCUMENTS

CN 105052170 A 11/2015
CN 105247885 A 1/2016
(Continued)

OTHER PUBLICATIONS

International Search Report and Written Opinion issued in PCT/CN2021/139379, mailed Aug. 25, 2022; 13 pgs.
(Continued)

*Primary Examiner* — Joseph Saunders, Jr.
(74) *Attorney, Agent, or Firm* — HAUPTMAN HAM, LLP

(57) ABSTRACT

Disclosed are an audio processing method for a noise-reduction earphone, a noise-reduction earphone, a device and a readable storage medium. The audio processing method for a noise-reduction earphone includes: obtaining a first sound signal collected by a feedback microphone, and determining a first transfer function corresponding to the first sound signal; obtaining a second sound signal collected by a feedforward microphone, and building a filtered sound signal according to the first transfer function and the second sound signal; and determining an eustachian tube sound signal corresponding to the filtered sound signal, performing ear blocking elimination processing on the eustachian tube sound signal to obtain a target sound signal, and outputting the target sound signal.

6 Claims, 2 Drawing Sheets

(52) U.S. Cl.
CPC ................ *G10K 2210/3026* (2013.01); *G10K 2210/3027* (2013.01); *G10K 2210/3028* (2013.01); *G10K 2210/3055* (2013.01)

(58) Field of Classification Search
CPC ... G10K 2210/3027; G10K 2210/3028; G10K 2210/3055
See application file for complete search history.

(56) References Cited

FOREIGN PATENT DOCUMENTS

| | | | |
|---|---|---|---|
| CN | 106888414 | A | 6/2017 |
| CN | 110418233 | A | 11/2019 |
| WO | 2020248113 | A1 | 12/2020 |
| WO | 2021135329 | A1 | 7/2021 |

OTHER PUBLICATIONS

First Office Action issued in Chinese Patent Application No. 2021114381070; mailed Jun. 6, 2022; 20 pgs.
Notification of Grant issued in Chinese Patent Application No. 2021114381070; mailed Jan. 5, 2023, 5 pgs.

* cited by examiner

AUDIO PROCESSING METHOD FOR NOISE-REDUCTION EARPHONE, NOISE-REDUCTION EARPHONE, DEVICE AND READABLE STORAGE MEDIUM

CROSS-REFERENCE TO RELATED APPLICATIONS

This application is a continuation application of International Application No. PCT/CN2021/139379, filed on Dec. 18, 2021, which claims priority to Chinese Patent Application No. 202111438107.0, filed on Nov. 29, 2021, entitled "AUDIO PROCESSING METHOD FOR NOISE-REDUCTION EARPHONE, NOISE-REDUCTION EARPHONE, DEVICE AND READABLE STORAGE MEDIUM", the entire contents of which are incorporated herein by reference.

TECHNICAL FIELD

The present application relates to the technical field of earphones, and in particular to an audio processing method for a noise-reduction earphone, a noise-reduction earphone, a device and a readable storage medium.

BACKGROUND

Most earphones currently on the market use a single noise-reduction mode. No matter whether the environment of the user is quiet or noisy, when active noise-reduction is performed, the earphones will adopt a same mode to offset the noise in the low frequency band. As for this earphone noise-reduction mode, in a quiet environment, if the low-frequency noise is reduced, the user will have a sense of negative pressure, resulting in an uncomfortable wearing experience. In addition, different users have different sensitivity to sounds with different frequencies, and there may be differences between the left and right ears. The existing products are not designed to be compatible with the different characteristics of users, so it is difficult to achieve a noise-reduction effect and experience that all users are satisfied with.

SUMMARY

The main purpose of the present application is to provide an audio processing method for a noise-reduction earphone, a noise-reduction earphone, a device and a readable storage medium, aiming to solve the technical problem of how to improve the noise-reduction effect of the earphone.

In order to achieve the above objectives, the present application provides an audio processing method for a noise-reduction earphone. The audio processing method for a noise-reduction earphone includes the following steps:

- obtaining a first sound signal collected by a feedback microphone, and determining a first transfer function corresponding to the first sound signal;
- obtaining a second sound signal collected by a feedforward microphone, and building a filtered sound signal according to the first transfer function and the second sound signal; and
- determining an eustachian tube sound signal corresponding to the filtered sound signal, performing ear blocking elimination processing on the eustachian tube sound signal to obtain a target sound signal, and outputting the target sound signal.

In an embodiment, before the obtaining the first sound signal collected by the feedback microphone, and determining the first transfer function corresponding to the first sound signal, the method includes:

- determining the second sound signal collected by the feedforward microphone, and determining a preset compensation value corresponding to the second sound signal; and
- compensating the second sound signal according to the preset compensation value to obtain a compensation sound signal, outputting the compensation sound signal, and controlling the feedback microphone to collect the first sound signal including the compensation sound signal.

In an embodiment, the determining the preset compensation value corresponding to the second sound signal includes:

- calculating a background noise according to the first sound signal and the second sound signal, obtaining a preset compensation value interval, determining a matching compensation value matching the background noise in the preset compensation value interval, and configuring the matching compensation value as the preset compensation value corresponding to the second sound signal.

In an embodiment, the determining the first transfer function corresponding to the first sound signal includes:

- determining a transfer function from the second sound signal to the first sound signal, and configuring the transfer function as the first transfer function.

In an embodiment, the building the filtered sound signal according to the first transfer function and the second sound signal includes:

- determining an amplitude and a phase of the first transfer function, and performing filtering processing on the second sound signal according to the amplitude and the phase of the first transfer function to obtain the filtered sound signal.

In an embodiment, the determining the eustachian tube sound signal corresponding to the filtered sound signal includes:

- superimposing the first sound signal and the filtered sound signal to obtain the eustachian tube sound signal.

In addition, in order to achieve the above objectives, the present application further provides a noise-reduction earphone including a feedforward microphone, a wind noise elimination module, a feedback microphone, an ear blocking elimination module, and a loudspeaker. An output end of the feedforward microphone is connected to an input end of the wind noise elimination module, both an output end of the feedback microphone and an output end of the wind noise elimination module are connected to an input end of the ear blocking elimination module, and an output end of the ear blocking elimination module is connected to the loudspeaker.

In an embodiment, the noise-reduction earphone further includes an unvarnished transmission module. The output end of the feedforward microphone is connected to an input end of the unvarnished transmission module, and an output end of the unvarnished transmission module is connected to the loudspeaker.

In addition, in order to achieve the above objectives, the present application further provides an audio processing device for the noise-reduction earphone including a memory, a processor, and an audio processing program for the noise-reduction earphone stored on the memory and executable by the processor. When the audio processing program for the noise-reduction earphone is executed by the processor, the audio processing method for the noise-reduction earphone as mentioned above is implemented.

In addition, in order to achieve the above objectives, the present application further provides a readable storage medium. An audio processing program for the noise-reduction earphone is stored on the non-transitory readable storage medium, and when the audio processing program for the noise-reduction earphone is executed by a processor, the audio processing method for the noise-reduction earphone as mentioned above is implemented.

In this embodiment, the first transfer function is determined based on the first sound signal collected by the feedback microphone, and the filtered sound signal is determined based on the second sound signal collected by the feedforward microphone. The eustachian tube sound signal corresponding to the filtered sound signal is determined, and then ear blocking elimination processing is performed to obtain and output the target sound signal. In this way, the phenomenon that noise-reduction earphones easily amplify wind noise or even break the sound when the gain is high in the low-frequency band can be avoided. By building the first transfer function, the ambient noise can be removed, and the target sound signal can be obtained directly without increasing the low-frequency gain, thereby improving the noise-reduction effect of the earphones.

The realization of the objective, functional characteristics, and advantages of the present application are further described with reference to the accompanying drawings.

DETAILED DESCRIPTION OF THE EMBODIMENTS

It should be understood that the embodiments described here are only used to explain the present application and are not used to limit the present application.

Figure 1:
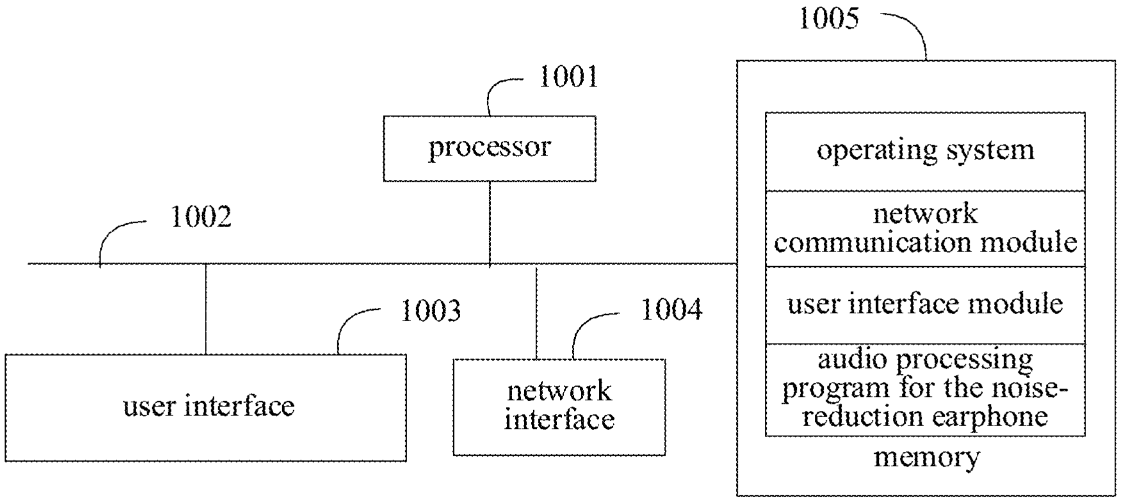
FIG. 1 is a schematic structural diagram of a terminal or a device under a hardware operating environment according to an embodiment of the present application.

As shown in FIG. 1, FIG. 1 is a schematic structural diagram of a terminal or a device under a hardware operating environment according to an embodiment of the present application.

The terminal in the embodiments of the present application is a noise-reduction earphone.

As shown in FIG. 1, the terminal may include a processor 1001, such as a central processing unit (CPU), a network interface 1004, a user interface 1003, a memory 1005, and a communication bus 1002. The communication bus 1002 is used to realize connection communication between these components. The user interface 1003 may include a display and an input unit such as a keyboard. The user interface 1003 may also include a standard wired interface and a wireless interface. The network interface 1004 may include a standard wired interface or a wireless interface (such as a WI-FI interface). The memory 1005 may be a high-speed RAM memory or a non-volatile memory, such as a disk memory. The memory 1005 may be a storage device independent of the aforementioned processor 1001.

In an embodiment, the terminal may also include a camera, a radio frequency (RF) circuit, a sensor, an audio circuit, a Wi-Fi module, and the like. Sensors can be a light sensor, a motion sensor, and other sensors. The light sensor may include an ambient light sensor and a proximity sensor. The ambient light sensor can adjust the brightness of the display according to the brightness of the ambient light, and the proximity sensor can turn off the display and/or the backlight when the terminal device moves close to the ear. Of course, the terminal device can also be equipped with other sensors such as a gyroscope, a barometer, a hygrometer, a thermometer, an infrared sensor, and the like, which will not be repeated here.

Those skilled in the art can understand that the terminal structure shown in FIG. 1 does not limit the terminal, which may include more or fewer components than shown, or combine some components, or arrange different components.

As shown in FIG. 1, the memory 1005 which is configured as a computer storage medium may include an operating system, a network communication module, a user interface module, and an audio processing program for the noise-reduction earphone.

In the terminal shown in FIG. 1, the network interface 1004 is mainly used to connect to the backend server and communicate with the backend server. The user interface 1003 is mainly used to connect to the client side (the user side) and communicate with the client side. The processor 1001 can be used to call the audio processing program for the noise-reduction earphone stored in memory 1005 and perform the following steps.

- obtaining a first sound signal collected by a feedback microphone, and determining a first transfer function corresponding to the first sound signal;
- obtaining a second sound signal collected by a feedforward microphone, and building a filtered sound signal according to the first transfer function and the second sound signal; and
- determining an eustachian tube sound signal corresponding to the filtered sound signal, performing ear blocking elimination processing on the eustachian tube sound signal to obtain a target sound signal, and outputting the target sound signal.

Figure 2:
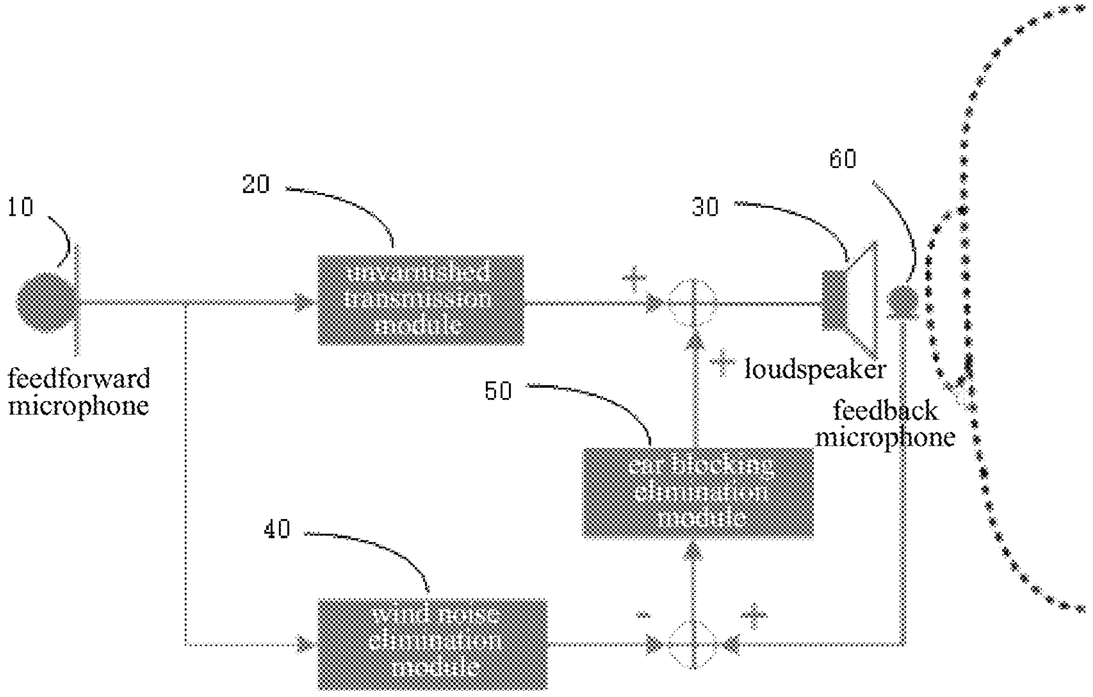
FIG. 2 is a schematic diagram of a device of a noise-reduction earphone of the present application.

In the embodiment of the present application, as shown in FIG. 2, the noise-reduction earphone includes a feedforward microphone 10, an unvarnished transmission module 20, a loudspeaker 30, a wind noise elimination module 40, an ear blocking elimination module 50 and a feedback microphone 60. The output end of the feedforward microphone 10 is connected to the input end of the wind noise elimination module 40, and the output end of the feedforward microphone 10 is connected to the input end of the unvarnished transmission module 20. The output end of the unvarnished transmission module 20 is connected to the loudspeaker. The output end of the wind noise elimination module 40 is connected to the input end of the ear blocking elimination module 50. The output end of the feedback microphone 60 is connected to the input end of the ear blocking elimination module 50, and the output end of the ear blocking elimination module 50 is connected to the loudspeaker 30. Moreover, after the feedforward microphone 10 collects the sound signal, compensation processing will first be performed by the unvarnished transmission module 20 and the loudspeaker 30 will play the sound. The feedback microphone 60 collects the sound signal that is emitted by the feedforward microphone 10 and passes through the unvarnished transmission module 20 and the loudspeaker 30, and also collects the external sound signal transmitted through the passive sound isolation of the noise-reduction earphone. A first transfer function is built based on all sound signals collected by the feedback microphone 60. The feedforward microphone 10 will transfer the collected sound signals to the wind noise elimination module 40 for filtering processing, and then will perform signal superposition processing to remove the external sound signals (such as the ambient noise) collected by the feedback microphone, leaving only the signal transmitted from the eustachian tube to the feedback microphone. Then the sound signals will finally be transmitted to the ear blocking elimination module 50 for processing, and is played through the loudspeaker 30 after the processing is finished.

In addition, in order to prevent the unvarnished transmission module 20 from easily amplifying the wind noise or even breaking the sound when the gain of the unvarnished transmission module 20 is high in the low frequency band, the wind noise elimination module 40 is provided in the noise-reduction earphones to avoid the ear blocking elimination module 50 from eliminating the ambient sound of the external world, which can also satisfy the requirement that when the ear blocking elimination module is operating, there is no need to increase the low-frequency gain in the unvarnished transmission module 20 to avoid amplification of the wind noise.

After the wind noise elimination module 40 is provided in the noise-reduction earphone, since the low-frequency gain in the unvarnished transmission module 20 is low, which is generally below 0 dB, the energy emitted by the loudspeaker 30 after being processed by the unvarnished transmission module 20 can be ignored, and only the energy entering and exiting through the passive sound isolation of the earphones is considered, so that the complexity of the system can be reduced, and impact and suppression on the wind noise will be little. Therefore, the wind noise elimination module 40 only needs to perform filter processing on the external sound signal collected by the feedforward microphone, to make the sound signal match the signal of the feedback microphone (for example, making the amplitude of the sound signal equal to the amplitude of signal of the feedback microphone and making the phase opposite to the phase of signal of the feedback microphone).

In addition, in the embodiment of the present application, a sound-emitting cavity is provided in the casing of the noise-reduction earphones. The feedback microphone 60 and the loudspeaker 30 are both installed in the sound-emitting cavity. The wind noise elimination module 40, the ear blocking elimination module 50 and the unvarnished transmission module 20 can be integrated at the main control circuit board and electrically connected to the processor of the main control circuit board. The main control circuit board is installed inside the casing, and the main control circuit board is electrically connected to the feedforward microphone 10, the loudspeaker 30 and the feedback microphone 60 through wires. In the embodiment of the present application, the type of noise-reduction earphones can be wired earphones or wireless earphones. When the noise-reduction earphone is the wired earphone, the music signal is obtained from the audio equipment through the earphone wire. When the noise-reduction earphone is the wireless earphone, the music signal is obtained from the audio equipment through the bluetooth module.

The external ambient sound (such as the ambient noise) picked up by the feedback microphone 60 in the sound-emitting cavity of the earphone after being attenuated by the housing and the sound signal transmitted from the feedforward microphone to the loudspeaker are converted into the electrical signals. Then the electrical signals and the electrical signal corresponding to the sound signal in the wind noise elimination module 40 are merged and processed. After being processed by the ear blocking elimination module, the merged signal and the music signal emitted from the audio equipment are inputted into the loudspeaker 10, then the loudspeaker 10 plays music and external ambient sounds. In this way, the user can clearly hear the external ambient sounds while listening to music.

In this embodiment, a noise-reduction earphone is provided, which includes a feedforward microphone, a wind noise elimination module, a feedback microphone, an ear blocking elimination module and a loudspeaker. In addition, the connection relationship between the feedforward microphone, the wind noise elimination module, the feedback microphone, the ear blocking elimination module and the loudspeaker can be built to prevent the noise-reduction earphones from easily amplifying the wind noise or even breaking the sound when the noise-reduction earphone has a higher gain in the low-frequency band, and the wind noise elimination module avoids the elimination of external ambient sounds. In addition, when the ear blocking elimination module is operating, there is no need to increase the low-frequency gain, which improves the noise-reduction effect of the earphones.

Figure 3:
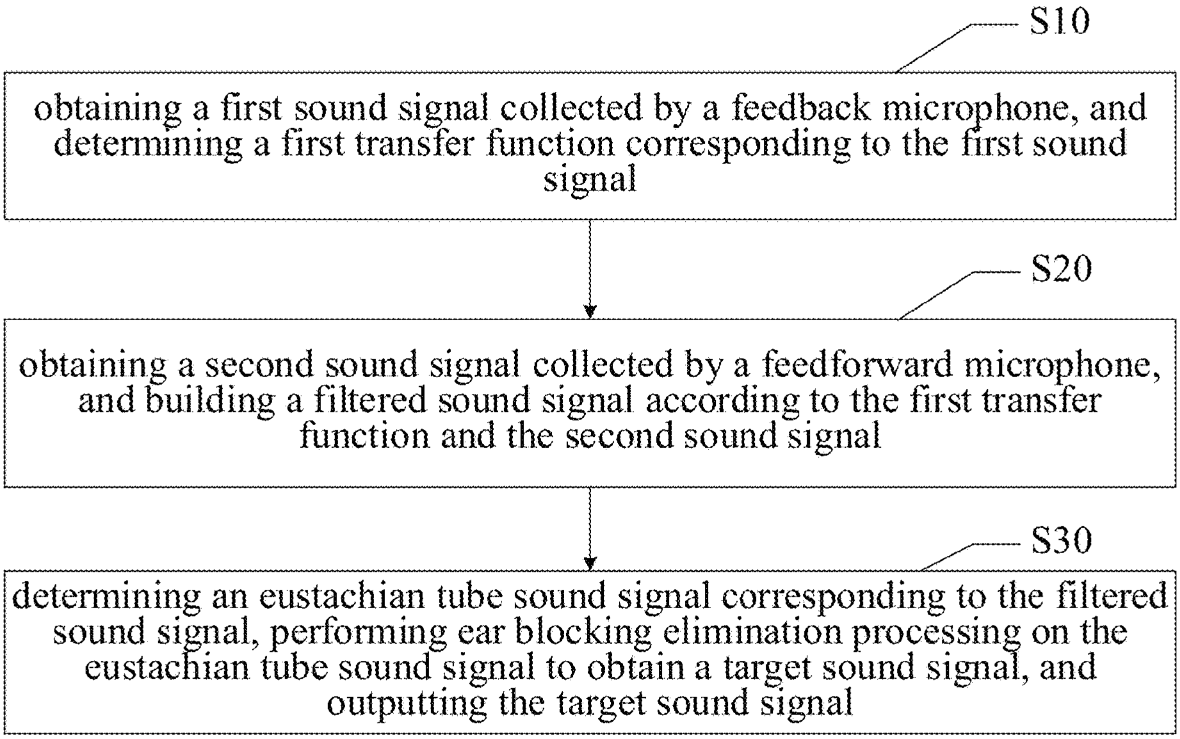
FIG. 3 is a schematic flowchart of an audio processing method for the noise-reduction earphone according to a first embodiment of the present application.

Based on the above hardware structure, as shown in FIG. 3, the present application provides an audio processing method for the noise-reduction earphone. In the first embodiment of the audio processing method for the noise-reduction earphone, the audio processing method for the noise-reduction earphone includes the following steps.

Step S10, obtaining a first sound signal collected by a feedback microphone, and determining a first transfer function corresponding to the first sound signal.

Through combining passive sound isolation and active noise-reduction, the noise-reduction earphone can reduce external noise energy. In order to allow users to hear external sounds, an unvarnished transmission mode is provided in the noise-reduction earphone, that is, the external ambient sound is picked up through the feedforward microphone, and is played by the loudspeaker after being processed by the unvarnished transmission module, to supplement the isolation of the passive sound isolation to the external sound, thereby allowing users to hear external sounds.

In addition, when the user wears noise-reduction earphones, the wearer's sound will be transmitted to the auditory meatus through the eustachian tube, which is mainly 1.5 KHz mid-low frequency sound, which will generate an ear-blocking effect. Therefore, a feedback channel can be provided based on the unvarnished transmission mode, and the wearer's sound transmitted to the auditory meatus is first picked up through the feedback channel, then is played by the loudspeaker for elimination after being processed by the ear blocking elimination module. The ear blocking elimination module is provided to effectively reduce the low-frequency rise of the wearer's voice. However, the ear blocking elimination module will also reduce external noise, that is, the low frequency will be reduced by 10-20 dB in unvarnished transmission mode. Therefore, in order to make the low frequency in the unvarnished transmission mode as close as possible to the external ambient, additional compensation is performed through the unvarnished transmission module in the unvarnished transmission mode.

In this embodiment, a wind noise elimination module can also be provided on the basis that the ear blocking elimination module is already provided. That is, the noise-reduction earphones in this embodiment can include a feedforward microphone, an unvarnished transmission module, and an ear blocking elimination module, a wind noise elimination module, a loudspeaker and a feedback microphone. Moreover, the feedback microphone can receive external sounds incoming through the passive sound isolation of the earphones, and can also receive the sounds that is emitted by the feedforward microphone and passes through the unvarnished transmission module and the loudspeaker. After the wind noise elimination module is provided, the low-frequency gain in the unvarnished transmission module is low, such as below 0 dB. Thus, when the low-frequency gain is superimposed with the part transmitted through passive sound isolation, the sound pressure level increases by less than 3 dB, which has little impact on the overall effect. Therefore, when the wind noise elimination module is working, the energy emitted by the loudspeaker after being processed by the unvarnished transmission module can be ignored, and only the energy transmitted mainly through the passive sound isolation of the noise-reduction earphone is considered. This has little impact and suppression on the wind noise, and will reduce the complexity of the system. Therefore, the wind noise elimination module in this embodiment only needs to filter the external sound signals collected by the feedforward microphone, and the filtering process is based on the passive sound isolation of the noise-reduction earphones.

Therefore, in this embodiment, after the sound signal collected by the feedforward microphone is processed by the unvarnished transmission module and then is played by the loudspeaker, the feedback microphone located near the loudspeaker collects the sound signal and configures the collected sound signal as the first sound signal, and the first transfer function P is determined based on the first sound signal. The way to determine the first transfer function between the feedforward microphone and the feedback microphone can be obtained through testing. When the audio equipment in the test ambient plays sound, the sound signal received by the feedforward microphone is Sf, and the sound signal received by the feedback microphone is Sb, then the first transfer function is P=Sb/Sf.

Step S20, obtaining a second sound signal collected by a feedforward microphone, and building a filtered sound signal according to the first transfer function and the second sound signal.

After the first transfer function is determined, the wind noise elimination module needs to perform filtering processing on the second sound signal collected by the feedforward microphone, so that the amplitude of the second sound signal is equal to P and the phase of the second sound signal is opposite. Therefore, after the second sound signal collected by the feedforward microphone is determined, the second sound signal collected by the feedforward microphone can be obtained through the wind noise elimination module, and the second sound signal can be processed according to the amplitude and the phase of the first transfer function, to obtain the sound signal, namely the filtered sound signal. The amplitude of the filtered sound signal is the same as the amplitude of the first sound signal, but the phase of the filtered sound signal is opposite to the phase of the first sound signal.

In this embodiment, since the first transfer function is P=Sb/Sf, the signal received by the feedforward microphone is filtered in the wind noise elimination module. If the feedforward microphone receives the signal A, then the signal is transmitted to the feedback microphone, and the signal received by the feedback microphone is the signal B. After the signal A in the feedforward microphone is filtered by the first transfer function, the signal −B with an opposite value to the feedback microphone is obtained, that is, A*P=−B. Then, by superimposing the signal B and the signal −B, the ambient noise received by the feedback microphone can be removed, leaving only the signal transmitted from the eustachian tube to the feedback microphone, and the signal is finally passed to the ear blocking elimination module for processing.

Step S30, determining an eustachian tube sound signal corresponding to the filtered sound signal, performing ear blocking elimination processing on the eustachian tube sound signal to obtain a target sound signal, and outputting the target sound signal.

In this embodiment, after the filtered sound signal in the wind noise elimination module is determined, the filtered sound signal and the first sound signal collected by the feedback microphone can be superimposed. Since the amplitude of the filtered sound signal is equal to the amplitude of the first sound signal and the phases of the filtered sound signal is opposite to the phases of the first sound signal, the ambient noise received by the feedback microphone can be removed after superposition processing, and only the sound signal transmitted from the eustachian tube to the feedback microphone is retained, that is, the eustachian tube sound signal is retained. Then the eustachian tube sound signal is inputted to the ear blocking elimination module for ear blocking elimination processing. After the processing is finished, the obtained target sound signal is outputted through the loudspeaker. That is, the first sound signal collected by the feedback microphone can subtract the eustachian tube sound signal to obtain the target sound signal, and then the target sound signal can be outputted through the loudspeaker.

In this embodiment, the first transfer function is determined based on the first sound signal collected by the feedback microphone, and the filtered sound signal is determined based on the second sound signal collected by the feedforward microphone. The eustachian tube sound signal corresponding to the filtered sound signal is determined, and then ear blocking elimination processing is performed to obtain and output the target sound signal. In this way, the phenomenon that noise-reduction earphones easily amplify wind noise or even break the sound when the gain is high in the low-frequency band can be avoided. By building the first transfer function, the ambient noise can be removed, and the target sound signal can be obtained directly without increasing the low-frequency gain, thereby improving the noise-reduction effect of the earphones.

Furthermore, based on the first embodiment of the present application, a second embodiment of the audio processing method for the noise-reduction earphone of the present application is proposed. In this embodiment, before the step S10, obtaining a first sound signal collected by a feedback microphone, and determining a first transfer function corresponding to the first sound signal, the method includes:

step a, determining the second sound signal collected by the feedforward microphone, and determining a preset compensation value corresponding to the second sound signal.

In this embodiment, before the determining the first transfer function from the feedforward microphone to the feedback microphone, it is necessary to obtain the sound signal collected by the feedforward microphone from the audio equipment and configure the sound signal as the second sound signal.

Moreover, since the unvarnished transmission module is provided in the noise-reduction earphones, the unvarnished transmission mode of the noise-reduction earphones can operate based on the unvarnished transmission module, that is, the second sound signal, such as the external ambient sound signal, is collected by the feedforward microphone. After compensation processing by the unvarnished transmission module, the sound signal is played by the loudspeaker to supplement the passive sound isolation of external sounds. Therefore, after obtaining the second sound signal collected by the feedforward microphone, it is necessary to determine the preset compensation value corresponding to the second sound signal in the unvarnished transmission module.

Step b, compensating the second sound signal according to the preset compensation value to obtain a compensation sound signal, outputting the compensation sound signal, and controlling the feedback microphone to collect the first sound signal including the compensation sound signal.

After the preset compensation value is determined, the second sound signal sent by the feedforward microphone can be compensated directly in the unvarnished transmission module according to the preset compensation value to obtain a compensation sound signal, and then the compensation sound signal is outputted through the loudspeaker. It should be noted that while the loudspeaker outputs the compensation sound signal, it will also output the sound signal transmitted by the ear blocking elimination module. Since the feedback microphone is provided near the loudspeaker, when the feedback microphone collects sound signals, in addition to collecting the external sound transmitted through the passive sound isolation of the noise-reduction earphones, the compensation sound signal is also collected. Therefore, the external sound collected by the feedback microphone through the passive sound isolation of the noise-reduction earphones and the compensation sound signal are configured as the first sound signal together.

In this embodiment, the second sound signal collected by the feedforward microphone and the corresponding preset compensation value are determined, and the second sound signal is compensated according to the preset compensation value, to obtain and output the compensation sound signal. Then the feedback microphone is controlled to collect the first sound signal including the compensation sound signal, thereby ensuring the accuracy and effectiveness of the obtained first sound signal.

In an embodiment, the determining the preset compensation value corresponding to the second sound signal includes:

step c, calculating a background noise according to the first sound signal and the second sound signal, obtaining a preset compensation value interval, determining a matching compensation value in a compensation value interval matching the background noise, and configuring the matching compensation value as a preset compensation value corresponding to the second sound signal.

Figure 4:
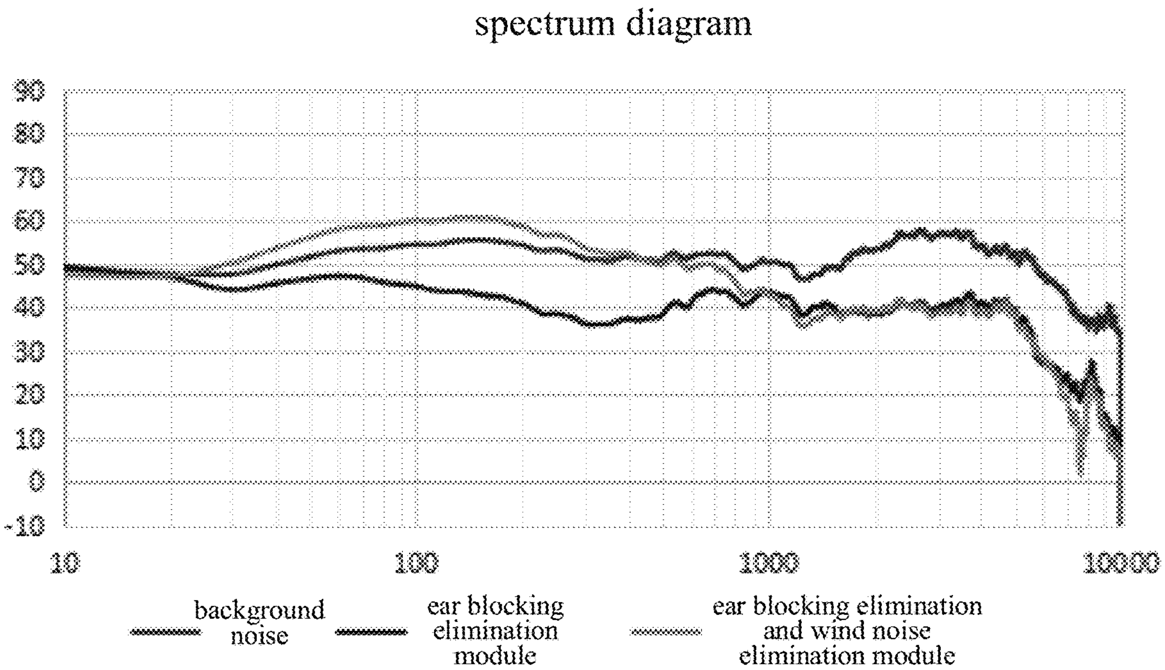
FIG. 4 is a spectrogram in the audio processing method for the noise-reduction earphone of the present application.

In this embodiment, since the unvarnished transmission module in the noise-reduction earphones compensates for the ambient sound received by the feedforward microphone, the remaining background noise is consistent or close to each other. Therefore, the preset compensation value can be calculated and determined based on the difference between the spectrum received by the human ear and the background noise when the user wears the earphones. For example, as shown in FIG. 4, FIG. 4 is a spectrum diagram received by the human ear in different system architectures, including a background noise, an ear blocking elimination module, an ear blocking elimination and wind noise elimination module. The low-frequency energy received by the human ear is low only when there is an ear blocking elimination module, and in this case, to achieve consistency with the background noise, the maximum compensation value of the unvarnished transmission module needs to be set to 15 dB. In another scenario in this embodiment, after a wind noise elimination module (such as an ear blocking elimination module and a wind noise elimination module) is provided, the low-frequency energy received by the human ear is higher than the background noise, and the compensation value of the unvarnished transmission module is a negative value. That is, regardless of whether there is a wind noise elimination module in the noise-reduction earphone, the difference between the compensation values in the unvarnished transmission module can reach 20 dB. Therefore, when wind blows to the feedforward microphone, the noise-reduction earphone with a wind noise elimination module are 20 dB lower than the noise-reduction earphone without a wind noise elimination module, which greatly reduces the impact of wind noise and improves the wind noise experience in the unvarnished transmission mode.

Moreover, in this embodiment, the compensation value in the unvarnished transmission module is also affected by the sensitivity of the microphone, the sensitivity of the loudspeaker, the frequency response, and the passive sound isolation of the earphone. That is, the lower the sensitivity of the microphone or the loudspeaker, the higher the compensation value.

Therefore, after the first sound signal and the second sound signal are determined, the background noise can be calculated directly based on the first sound signal and the second sound signal, and then the matching noise that matches the background noise can be determined in the compensation value interval (such as 10-20 dB) set in advance. The compensation value corresponding to the matching noise is used as the matching compensation value, and the matching compensation value is used as the preset compensation value.

In this embodiment, the background noise is calculated based on the first sound signal and the second sound signal, and then the matching compensation value that matches the background noise is determined in the compensation value interval and is used as the preset compensation value, thereby ensuring the accuracy and effectiveness of the obtained preset compensation value.

In an embodiment, the determining the first transfer function corresponding to the first sound signal includes:

step d, determining a transfer function from the second sound signal to the first sound signal, and configuring the transfer function as the first transfer function.

In this embodiment, when the first transfer function from the feedforward microphone to the feedback microphone is determined, the transfer function from the first sound signal to the second sound signal can be determined, and the transfer function can be used as the first transfer function. For example, if the first sound signal is Sb and the second sound signal is Sf, then the first transfer function is determined as P=Sb/Sf. The direction of the first transfer function is from the first sound signal to the second sound signal.

In this embodiment, the transfer function from the first sound signal to the second sound signal is used as the first transfer function, thus the change in volume from the feedforward microphone to the feedback microphone is reflected, thereby ensuring the accuracy and effectiveness of the obtained first transfer function.

Further, the building a filtered sound signal according to the first transfer function and the second sound signal includes:

step e, determining an amplitude and a phase of the first transfer function, and performing filtering processing on the second sound signal according to the amplitude and the phase of the first transfer function to obtain a filtered sound signal.

In this embodiment, after the first transfer function is determined, the second sound signal collected in the feedforward microphone needs to be filtered through the wind noise elimination module. When the wind noise elimination module performs filtering processing, it is necessary to first determine the amplitude and the phase of the first transfer function, and then adjust the second sound signal to the sound signal, namely the filtered sound signal with an amplitude equal to the first transfer function and a phase opposite to the first transfer function.

In this embodiment, filtering processing is performed on the second sound signal according to the amplitude and the phase of the first transfer function to obtain the filtered sound signal, so that ambient noise can be removed based on the filtered sound signal, ensuring accuracy and effectiveness of the obtained filtered sound signal.

In an embodiment, the determining the target sound signal of the filtered sound signal includes:

step f, superimposing the first sound signal and the filtered sound signal to obtain the eustachian tube sound signal.

In this embodiment, after the first sound signal and the filtered sound signal are determined, since the amplitude of the filtered sound signal is equal to the first sound signal and the phase of the filtered sound signal is opposite to the first sound signal, the signals can be directly superimposed in this case, and the ambient noise received by the feedback microphone can be removed, to obtain the eustachian tube sound signal, namely the sound signal transmitted from the eustachian tube to the feedback microphone. The ambient noise can include the sound generated in the auditory meatus when the ambient sound of the feedforward microphone amplified by the unvarnished transmission is played by the loudspeaker, and the ambient noise can also include the the sound received by the feedback microphone after the passive noise-reduction.

In this embodiment, by superimposing the first sound signal and the filtered sound signal, the eustachian tube sound signal can be obtained, ensuring the accuracy and effectiveness of the obtained eustachian tube sound signal.

In addition, the present application also provides an audio processing device for the noise-reduction earphone. The audio processing device for the noise-reduction earphone includes a memory, a processor, and an audio processing program for the noise-reduction earphone stored on the memory. The processor is used to execute the audio processing program for the noise-reduction earphone, to implement the steps of each embodiment of the above-mentioned audio processing method for the noise-reduction earphone.

The specific implementation of the audio processing device for the noise-reduction earphone of the present application is basically the same as the above embodiments of the audio processing method for the noise-reduction earphone, which will not be repeated here.

The present application also provides a readable storage medium. The readable storage medium can be a computer-readable storage medium. The computer-readable storage medium stores one or more programs. The one or more programs can also be executed by one or more processors to implement the above embodiments of the audio processing method for the noise-reduction earphone.

The specific implementation of the computer-readable storage medium of the present application is basically the same as the above embodiments of the audio processing method for the noise-reduction earphone, which will not be repeated here.

It should be noted that, in the present application, the terms "include", "comprise" or any other variation thereof are intended to cover a non-exclusive inclusion, such that a process, method, article or system that includes a series of elements not only includes those elements, but also includes other elements not expressly listed or that are inherent to the process, method, article or system. Without further limitation, an element qualified by the statement "includes a . . . " does not exclude the presence of other same elements in the process, method, article or system that includes the element.

The above serial numbers of the embodiments of the present application are only for description and do not represent the advantages and disadvantages of the embodiments.

Through the above description of the embodiments, those skilled in the art can clearly understand that the methods of the above embodiments can be implemented by means of software plus the necessary general hardware platform. Of course, it can also be implemented by hardware, but in many cases the former is better. Based on this, the essence in the technical solution of the present application or the part contributing to the existing technology can be embodied in the form of a software product. The computer software product is stored in a storage medium (such as the read only memory/random access memory (ROM/RAM), the magnetic disk, the optical disk) as mentioned above, which includes several instructions to cause a terminal device (which can be a mobile phone, computer, server, air conditioner, or network device, and the like) to execute the methods described in various embodiments of the present application.

The above are only embodiments of the present application, and do not limit the patent scope of the present application. Any equivalent structure or equivalent process transformation made using the contents of the description and drawings of the present application, or directly or indirectly applied to other related technologies fields are equally included in the scope of patent protection of the present application.

What is claimed is:

1. An audio processing method for a noise-reduction earphone, comprising:

obtaining a first sound signal collected by a feedback microphone, and determining a first transfer function corresponding to the first sound signal;

obtaining a second sound signal collected by a feedforward microphone, and building a filtered sound signal according to the first transfer function and the second sound signal; and determining an eustachian tube sound signal corresponding to the filtered sound signal, performing ear blocking elimination processing on the eustachian tube sound signal to obtain a target sound signal, and outputting the target sound signal;

wherein before the obtaining the first sound signal collected by the feedback microphone, and determining the first transfer function corresponding to the first sound signal, the method comprises:

determining the second sound signal collected by the feedforward microphone, and determining a preset compensation value corresponding to the second sound signal; and compensating the second sound signal according to the preset compensation value to obtain a compensation sound signal, outputting the compensation sound signal, and controlling the feedback microphone to collect the first sound signal comprising the compensation sound signal;

wherein the determining the preset compensation value corresponding to the second sound signal comprises:

calculating a background noise according to the first sound signal and the second sound signal, obtaining a preset compensation value interval, determining a matching compensation value matching the background noise in the preset compensation value interval, and configuring the matching compensation value as the preset compensation value corresponding to the second sound signal;

wherein the preset compensation value interval is in a range from 10 dB to 20 dB.

2. The audio processing method for the noise-reduction earphone according to claim 1, wherein the determining the first transfer function corresponding to the first sound signal comprises:

determining a transfer function from the second sound signal to the first sound signal, and configuring the transfer function as the first transfer function.

3. The audio processing method for the noise-reduction earphone according to claim 1, wherein the building the filtered sound signal according to the first transfer function and the second sound signal comprises:

determining an amplitude and a phase of the first transfer function, and performing filtering processing on the second sound signal according to the amplitude and the phase of the first transfer function to obtain the filtered sound signal.

4. The audio processing method for the noise-reduction earphone according to claim 1, wherein the determining the eustachian tube sound signal corresponding to the filtered sound signal comprises:

superimposing the first sound signal and the filtered sound signal to obtain the eustachian tube sound signal.

5. An audio processing device for the noise-reduction earphone, comprising:

a memory;

a processor; and an audio processing program for the noise-reduction earphone stored on the memory and executable by the processor;

wherein when the audio processing program for the noise-reduction earphone is executed by the processor, the audio processing method for the noise-reduction earphone according to claim 1 is implemented.

6. A non-transitory readable storage medium, wherein an audio processing program for the noise-reduction earphone is stored on the non-transitory readable storage medium, and when the audio processing program for the noise-reduction earphone is executed by a processor, the audio processing method for the noise-reduction earphone according to claim 1 is implemented.

* * * * *